US011444706B2

(12) United States Patent
Yang et al.

(10) Patent No.: US 11,444,706 B2
(45) Date of Patent: Sep. 13, 2022

(54) ANTENNA MODULE INCLUDING COMMUNICATION MODULE CAPABLE OF DETERMINING ABNORMALITY OF TRANSMISSION OR RECEPTION PATH

(71) Applicant: Samsung Electronics Co., Ltd., Gyeonggi-do (KR)

(72) Inventors: Dongil Yang, Gyeonggi-do (KR); Seonjun Kim, Gyeonggi-do (KR); Jonghyun Park, Gyeonggi-do (KR); Doohwan Lee, Gyeonggi-do (KR); Jongin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/285,943

(22) PCT Filed: Oct. 22, 2019

(86) PCT No.: PCT/KR2019/013855
§ 371 (c)(1),
(2) Date: Apr. 16, 2021

(87) PCT Pub. No.: WO2020/085746
PCT Pub. Date: Apr. 30, 2020

(65) Prior Publication Data
US 2021/0384991 A1    Dec. 9, 2021

(30) Foreign Application Priority Data
Oct. 24, 2018  (KR) .......................... 10-2018-0127378

(51) Int. Cl.
*H04B 17/17*    (2015.01)
*H04B 17/318*   (2015.01)

(52) U.S. Cl.
CPC ........... *H04B 17/17* (2015.01); *H04B 17/318* (2015.01)

(58) Field of Classification Search
CPC .............................. H04B 17/17; H04B 17/318
(Continued)

(56) References Cited

U.S. PATENT DOCUMENTS 6,520,448 B1 *  2/2003  Doty ....................... F42B 15/01
                                                         342/450
7,224,170 B2    5/2007  Graham et al.
(Continued)

FOREIGN PATENT DOCUMENTS

CN    106068579 A     11/2016
EP    2 253 081 A1    11/2010
(Continued)

OTHER PUBLICATIONS

European Search Report dated Sep. 9, 2021.
Office Action dated Apr. 20, 2022.

Primary Examiner — Hai V Nguyen
(74) Attorney, Agent, or Firm — Cha & Reiter, LLC

(57) ABSTRACT

Disclosed is an antenna module, which include a first antenna element, a second antenna element, and a communication module that includes a first transmit path and a first receive path connected with the first antenna element, a second transmit path and a second receive path connected with the second antenna element, and a detection circuit connected with at least a part of the second receive path. The communication module may output a specified signal by using the first transmit path and the first antenna element based at least on obtaining a request for identifying a state of the antenna module from an external device, may obtain the output specified signal by using the second receive path and the second antenna element, may identify an intensity of the obtained specified signal by using the detection circuit, (Continued)

and may determine whether the antenna module is abnormal, based at least on the intensity of the obtained specified signal. Moreover, various embodiment found through the present disclosure are possible.

14 Claims, 10 Drawing Sheets

(58) Field of Classification Search
USPC .................................................. 455/115.3
See application file for complete search history.

(56) References Cited

U.S. PATENT DOCUMENTS

| | | | |
|---|---|---|---|
| 7,978,659 B2 | 7/2011 | Li et al. | |
| 8,594,052 B2 | 11/2013 | Li et al. | |
| 8,862,073 B2* | 10/2014 | Erceg | H04B 1/0458 |
| | | | 455/176.1 |
| 8,918,060 B2 | 12/2014 | Duperray | |
| 9,084,124 B2 | 7/2015 | Nickel et al. | |
| 9,319,908 B2* | 4/2016 | Nickel | H04W 24/06 |
| 9,473,916 B2 | 10/2016 | Van Phan et al. | |
| 9,673,916 B2* | 6/2017 | Mow | H04B 17/19 |
| 9,692,530 B2 | 6/2017 | O'Keeffe et al. | |
| 9,960,864 B2* | 5/2018 | Mow | H04B 17/19 |
| 10,056,990 B2* | 8/2018 | Takahashi | H01Q 21/08 |
| 10,283,848 B2 | 5/2019 | Rheinfelder et al. | |
| 10,454,596 B2 | 10/2019 | Mow et al. | |
| 10,469,136 B2 | 11/2019 | Kim et al. | |
| 10,637,590 B2* | 4/2020 | El-Hassan | H04B 17/101 |
| 10,700,419 B2 | 6/2020 | Rheinfelder et al. | |
| 11,003,414 B2* | 5/2021 | Choi | G10L 21/0316 |
| 2003/0118143 A1* | 6/2003 | Bellaouar | H03L 7/1976 |
| | | | 375/336 |
| 2006/0145884 A1 | 7/2006 | Graham et al. | |
| 2009/0081965 A1* | 3/2009 | Erceg | H04B 5/0012 |
| | | | 342/374 |
| 2009/0232010 A1 | 9/2009 | Li et al. | |
| 2011/0261684 A1 | 10/2011 | Li et al. | |
| 2013/0084852 A1 | 4/2013 | Duperray | |
| 2013/0183911 A1* | 7/2013 | Erceg | H04B 5/0012 |
| | | | 455/78 |
| 2014/0179239 A1 | 6/2014 | Nickel et al. | |
| 2016/0179239 A1 | 6/2016 | Marui | |
| 2016/0254870 A1 | 9/2016 | O'Keeffe et al. | |
| 2016/0308626 A1* | 10/2016 | Mow | H04B 17/14 |
| 2017/0346576 A1* | 11/2017 | Takahashi | H01Q 3/267 |
| 2018/0048398 A1* | 2/2018 | El-Hassan | H01Q 3/36 |
| 2018/0219637 A1 | 8/2018 | Mow et al. | |
| 2019/0089419 A1 | 3/2019 | Kim et al. | |
| 2020/0042285 A1* | 2/2020 | Choi | G06N 3/04 |
| 2020/0176887 A1* | 6/2020 | Lee | H01Q 9/0442 |
| 2020/0280139 A1* | 9/2020 | Lee | H01Q 9/0442 |
| 2021/0013592 A1 | 1/2021 | Rheinfelder et al. | |
| 2021/0384991 A1* | 12/2021 | Yang | H04B 17/17 |

FOREIGN PATENT DOCUMENTS

| | | |
|---|---|---|
| EP | 3182509 A1 | 6/2017 |
| KR | 10-2003-0086834 A | 11/2003 |
| KR | 10-2007-0053561 A | 5/2007 |
| KR | 10-2018-0044864 A | 5/2018 |
| NO | 2013/045409 A1 | 4/2013 |

* cited by examiner

ANTENNA MODULE INCLUDING COMMUNICATION MODULE CAPABLE OF DETERMINING ABNORMALITY OF TRANSMISSION OR RECEPTION PATH

CROSS REFERENCE TO RELATED APPLICATIONS

This application is a National Phase Entry of PCT International Application No. PCT/KR2019/013855, which was filed on Oct. 22, 2019, and claims a priority to Korean Patent Application No. 10-2018-0127378, which was filed on Oct. 24, 2018, the contents of which are incorporated herein by reference.

TECHNICAL FIELD

Embodiments of the disclosure relates to a test method for determining whether an abnormality associated with transmission/reception occurs at a 5G antenna module.

BACKGROUND ART

Various methods are utilized to determine whether a 5G antenna module is normal or abnormal. For example, a first method may dispose an antenna module included in an electronic device at a test jig and may measure beams in all directions of the electronic device. An effective isotropic radiated power (EIRP) of a beam and a pattern of a beam may be compared with given reference data. Because the first method requires a chamber and measurement equipment for 5G antenna, the first method may be used in a factory.

For example, a second method may be a method for mounting a 5G antenna module in a test jig and measuring a power output from the 5G antenna module at a given location and in a given direction. The measured value may be compared with a given reference. Compared to the first method, the second method reduces a test time but requires a test bed setup for measurement.

DISCLOSURE

Technical Problem

Existing methods may require separate equipment, such as a chamber and a measurement device, or a facility. As such, a long time is required to determine whether a 5G antenna module is normal or abnormal, or costs for installation increase.

Various embodiments of the disclosure are directed to provide an electronic device capable of quickly determining whether a 5G antenna module is normal or abnormal, without a separate installation.

Technical Solution

An antenna module according to an embodiment of the disclosure may include a first antenna element, a second antenna element, and a communication module that includes a first transmit path and a first receive path connected with the first antenna element, a second transmit path and a second receive path connected with the second antenna element, and a detection circuit connected with at least a part of the second receive path. The communication module may output a specified signal by using the first transmit path and the first antenna element based at least on obtaining a request for identifying a state of the antenna module from an external device, may obtain the output specified signal by using the second receive path and the second antenna element, may identify an intensity of the obtained specified signal by using the detection circuit, and may determine whether the antenna module is abnormal, based at least on the intensity of the obtained specified signal.

An electronic device according to an embodiment of the disclosure may include an antenna array that includes a plurality of antenna elements, a first communication circuit that transmits/receives a signal in a frequency band of 20 GHz or higher by using the antenna array, the first communication circuit including at least one receive path of a signal associated with the antenna array and an AM receiver electrically connected with the at least one receive path and receives the signal, at least one processor that is operatively connected with the first communication circuit, and a nonvolatile memory that stores a plurality of reference values associated with the plurality of antenna elements. The at least one processor may obtain signal information about at least one antenna element of the plurality of antenna elements from the AM receiver and may compare a digital value converted from the signal information and a reference value associated with the at least one antenna element.

An antenna module according to an embodiment of the disclosure may include a first antenna module, a second antenna element, a first sub transmission circuit and a first sub reception circuit that are connected with the first antenna element, a second sub transmission circuit and a second sub reception circuit that are connected with the second antenna element, a transmission circuit that is connected with the first sub transmission circuit and the second sub transmission circuit, a reception circuit that is connected with the first sub reception circuit and the second sub reception circuit, and a communication module that includes a detection circuit connected with at least a part of the reception circuit. The communication module 190 may output a specified signal by using the transmission circuit, the first sub transmission circuit, and the first antenna element based at least on obtaining a request for identifying a state of the antenna module from an external device, may obtain the output specified signal by using the second antenna element, the second sub reception circuit, and the reception circuit, may identify an intensity of the obtained specified signal by using the detection circuit, and may determine whether the antenna module is abnormal, based at least on the intensity of the obtained specified signal.

Advantageous Effects

According to embodiments of the disclosure, the performance of a 5G antenna module embedded in an electronic device may be quickly measured without separate equipment.

Besides, a variety of effects directly or indirectly understood through this disclosure may be provided.

With regard to description of drawings, the same or similar components will be marked by the same or similar reference signs.

MODE FOR INVENTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
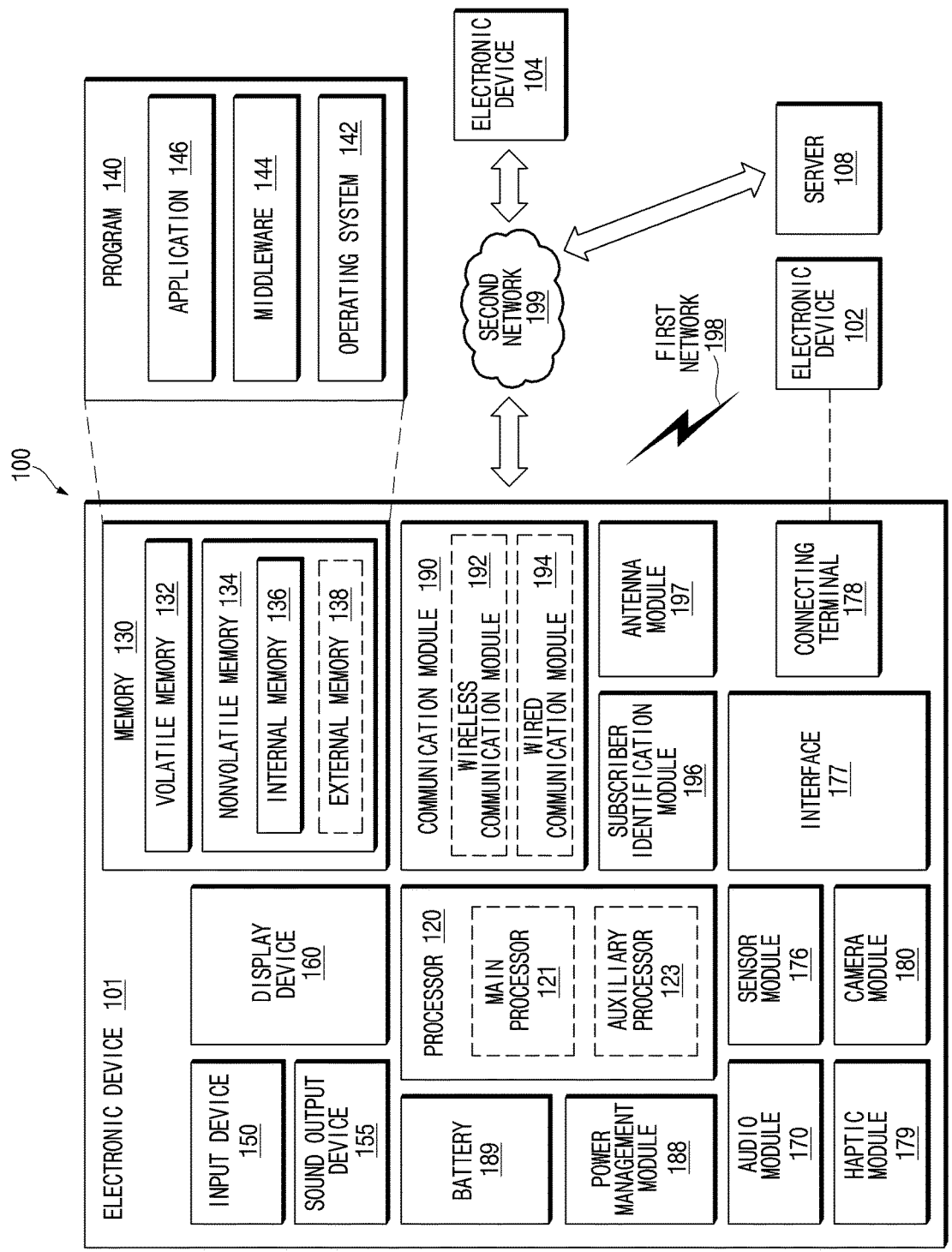
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
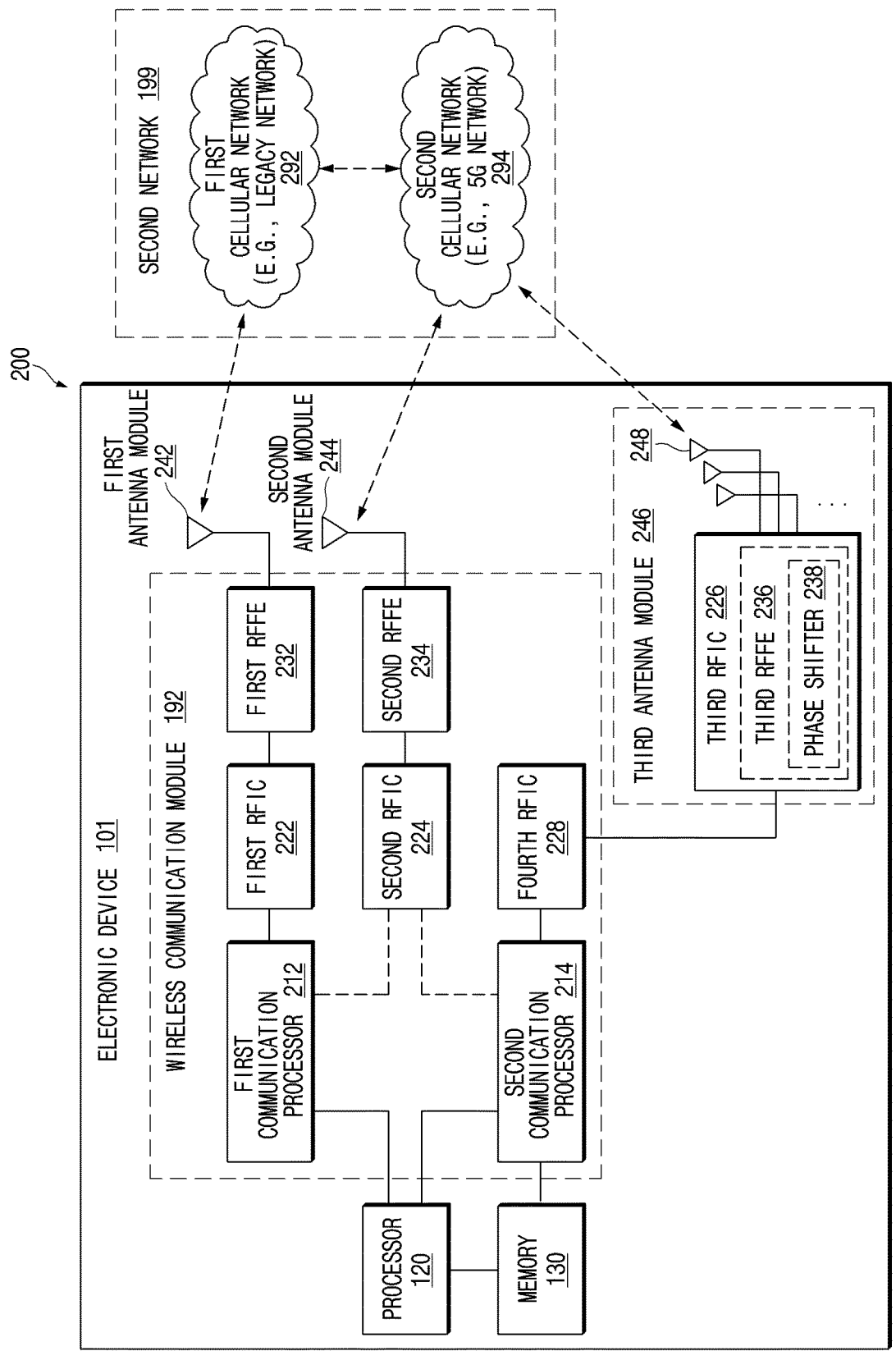
FIG. 2 is a block diagram of an electronic device in a network environment including a plurality of cellular networks, according to various embodiments.

FIG. 2 is a block diagram 200 of the electronic device 101 in a network environment including a plurality of cellular networks, according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one component of the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may establish a communication channel of a band to be used for wireless communication with the first cellular network 292 and may support legacy network communication over the established communication channel. According to various embodiments, the first cellular network 292 may be a legacy network including a $2^{nd}$ generation (2G), 3G, 4G, or long term evolution (LTE) network. The second communication processor 214 may establish a communication channel corresponding to a specified band (e.g., about 6 GHz to about 60 GHz) of bands to be used for wireless communication with the second cellular network 294 and may support 5G network communication over the established communication channel. According to various embodiments, the second cellular network 294 may be a 5G network defined in the 3GPP. Additionally, according to an embodiment, the first communication processor 212 or the second communication processor 214 may establish a communication channel corresponding to another specified band (e.g., about 6 GHz or lower) of the bands to be used for wireless communication with the second cellular network 294 and may support 5G network communication over the established communication channel. According to an embodiment, the first communication processor 212 and the second communication processor 214 may be implemented in a single chip or a single package. According to various embodiments, the first communication processor 212 or the second communication processor 214 may be implemented in a single chip or a single package together with the processor 120, the auxiliary processor 123, or the communication module 190. According to an embodiment, the first communication processor 212 and the second communication processor 214 may be directly or indirectly connected by an interface (not illustrated) and may provide or receive data or a control signal unidirectionally or bidirectionally.

In the case of transmitting a signal, the first RFIC 222 may convert a baseband signal generated by the first communication processor 212 into a radio frequency (RF) signal of about 700 MHz to about 3 GHz that is used in the first cellular network 292 (e.g., a legacy network). In the case of receiving a signal, an RF signal may be obtained from the first cellular network 292 (e.g., a legacy network) through an antenna (e.g., the first antenna module 242) and may be pre-processed through an RFFE (e.g., the first RFFE 232). The first RFIC 222 may convert the pre-processed RF signal into a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., about 6 GHz or lower) used in the second cellular network 294 (e.g., a 5G network). In the case of receiving a signal, a 5G Sub6 RF signal may be obtained from the second cellular network 294 (e.g., a 5G network) through an antenna (e.g., the second antenna module 244) and may be pre-processed through an RFFE (e.g., the second RFFE 234). The second RFIC 224 may convert the pre-processed 5G Sub6 RF signal into a baseband signal so as to be processed by a relevant communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., about 6 GHz to about 60 GHz) to be used in the second cellular network 294 (e.g., a 5G network). In the case of receiving a signal, a 5G Above6 RF signal may be obtained from the second cellular network 294 (e.g., a 5G network) through an antenna (e.g., the antenna 248) and may be pre-processed through a third RFFE 236. The third RFIC 226 may convert the preprocessed 5G Above6 RF signal into a baseband signal so as to be processed by the second communication processor 214. According to an embodiment, the third RFFE 236 may be implemented as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal (hereinafter referred to as an "IF signal") in an intermediate frequency band (e.g., about 9 GHz to about 11 GHz) and may provide the IF signal to the third RFIC 226. The third RFIC 226 may convert the IF signal into a 5G Above6 RF signal. In the case of receiving a signal, a 5G Above6 RF signal may be received from the second cellular network 294 (e.g., a 5G network) through an antenna (e.g., the antenna 248) and may be converted into an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented with a single chip or at least a part of a single package. According to an embodiment, the first RFFE 232 and the second RFFE 234 may be implemented with a single chip or at least a part of a single package. According to an embodiment, at least one of the first antenna module 242 or the second antenna module 244 may be omitted or may be combined with any other antenna module to process RF signals in a plurality of corresponding bands.

According to an embodiment, the third RFIC 226 and the antenna 248 may be disposed at the same substrate to form a third antenna module 246. For example, the wireless communication module 192 or the processor 120 may be disposed at a first substrate (e.g., a main PCB). In this case, the third RFIC 226 may be disposed in a partial region (e.g., on a lower surface) of a second substrate (e.g., a sub PCB) independent of the first substrate, and the antenna 248 may be disposed in another partial region (e.g., on an upper surface) of the second substrate. As such, the third antenna module 246 may be formed. As the third RFIC 226 and the antenna 248 are disposed at the same substrate, it may be possible to decrease a length of a transmission line between the third RFIC 226 and the antenna 248. For example, the decrease in the transmission line may make it possible to prevent a signal in a high-frequency band (e.g., about 6 GHz to about 60 GHz) used for 5G network communication from being lost (or attenuated) due to the transmission line. As such, the electronic device 101 may improve the quality or speed of communication with the second cellular network 294 (e.g., a 5G network).

According to an embodiment, the antenna 248 may be formed of an antenna array that includes a plurality of antenna elements capable of being used for beamforming. In this case, the third RFIC 226 may include, for example, a plurality of phase shifters 238 corresponding to the plurality of antenna elements as a part of the third RFFE 236. In the case of transmitting a signal, each of the plurality of phase shifters 238 may shift a phase of a 5G Above6 RF signal to be transmitted to the outside (e.g., a base station of a 5G network) of the electronic device 101 through the corresponding antenna element. In the case of receiving a signal, each of the plurality of phase shifters 238 may shift a phase of a 5G Above6 RF signal received from the outside through the corresponding antenna element to the same or substantially the same phase. This may enable the transmission or reception between the electronic device 101 and the outside through the beamforming.

The second cellular network 294 (e.g., a 5G network) may be used independently of the first cellular network 292 (e.g., a legacy network) (e.g., this being called "stand-alone (SA) ") or may be used in connection with the first cellular network 292 (e.g., this being called "non-stand alone (NSA) "). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 212, or the second communication processor 214).

Figure 3A:
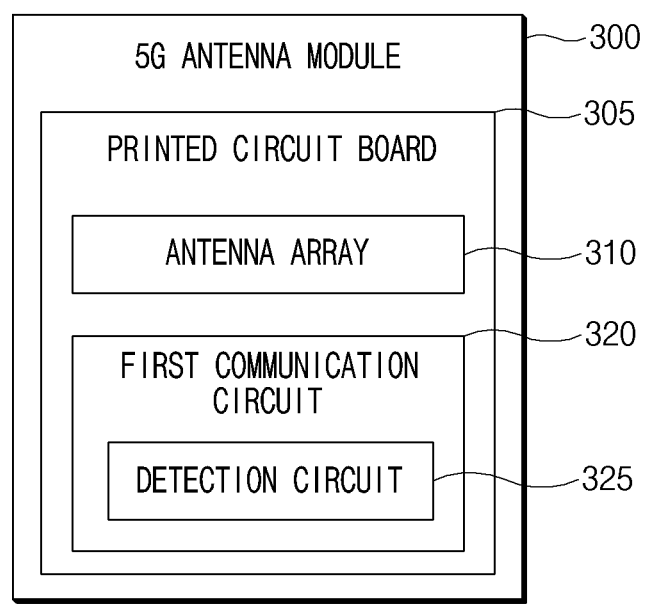
FIG. 3A is a block diagram of a 5G antenna module according to an embodiment.

FIG. 3A is a block diagram of a 5G antenna module 300 according to an embodiment.

In an embodiment, the electronic device 101 may include a processor (e.g., the processor 120, the first communication processor 212, and/or the second communication processor 214 of FIG. 2), the memory 130, and the 5G antenna module 300 (e.g., the third antenna module 246 of FIG. 2). In an embodiment, the 5G antenna module 300 may include a printed circuit board (PCB) 305, an antenna array 310, and a first communication circuit 320 (e.g., an RFIC). The electronic device 101 may include a second communication circuit (e.g., an RFFE or an inter frequency integrated circuit (IFIC)). The processor may directly/indirectly control the first communication circuit 320 and the second communication circuit of the 5G antenna module 300. The processor 120 may be understood, for example, as an application processor and/or a communication processor.

In various embodiments, the antenna array 310 and the first communication circuit 320 of the 5G antenna module 300 may be located at the printed circuit board 305. For example, the antenna array 310 may be disposed on a first surface of the printed circuit board 305, and the first communication circuit 320 may be disposed on a second surface of the printed circuit board 305. Alternatively, the antenna array 310 and the first communication circuit 320 may be disposed on one surface of the printed circuit board 305. Below, a printed circuit board is abbreviated to "PCB".

In various embodiments, the PCB 305 may include a coaxial cable connector or a board-to-board (B-to-B) connector for an electrical connection with any other PCB (e.g., a main PCB). The PCB 305 may be connected with the main PCB, on which the second communication circuit is disposed, by a coaxial cable by using the coaxial cable connector, for example. The coaxial cable may be used for a transfer of transmit and receive IF signals or an RF signal. For another example, a power or any other control signal may be transferred through the B-to-B connector.

According to an embodiment, the antenna array 310 may include a plurality of antenna elements. Each of the plurality of antenna elements may include an independent receive path (e.g., an Rx chain) and an independent transmit path (e.g., a Tx chain) corresponding thereto. The plurality of antenna elements may include a patch antenna or a dipole antenna. For example, each of the plurality of antenna elements may be understood as a conductive pattern.

According to an embodiment, the first communication circuit 320 may support an mmWave signal including a frequency band of 20 GHz or higher. According to an embodiment, the first communication circuit 320 may up-convert or down-convert a frequency of a signal. For example, the first communication circuit 320 may up-convert an IF signal received from the second communication circuit into an mmWave signal. Alternatively, the first communication circuit 320 may down-convert an mmWave signal received through the antenna array 310 into an IF signal and may transmit the IF signal to the second communication circuit.

In an embodiment, the first communication circuit 320 may include a detection circuit 325. The detection circuit 325 may be connected with at least a portion of the first communication circuit 320. The detection circuit 325 may obtain a signal that is input to the receive path corresponding to at least one antenna element included in the antenna array 310.

In an embodiment, the detection circuit 325 may identify the intensity of the obtained signal. The detection circuit 325 may identify an absolute value of an amplitude of the input signal. A circuit or an IC capable of measuring an absolute value of the amplitude of the input signal may be applied to the detection circuit 325. For example, the detection circuit 325 may include an amplitude modulation (AM) receiver (e.g., an AM receiver 330 of FIG. 3B).

In an embodiment, the AM receiver 330 of the detection circuit 325 may be disposed on a receive path corresponding to the at least one antenna element included in the antenna array 310. The AM receiver 330 may receive an mmWave signal associated with the antenna element in a non-coherent manner. The AM receiver 330 may generate information about the mmWave signal, based on the received mmWave signal. Below, the information about the mmWave signal generated by the AM receiver 330 is referred to as "signal information".

Figure 3B:
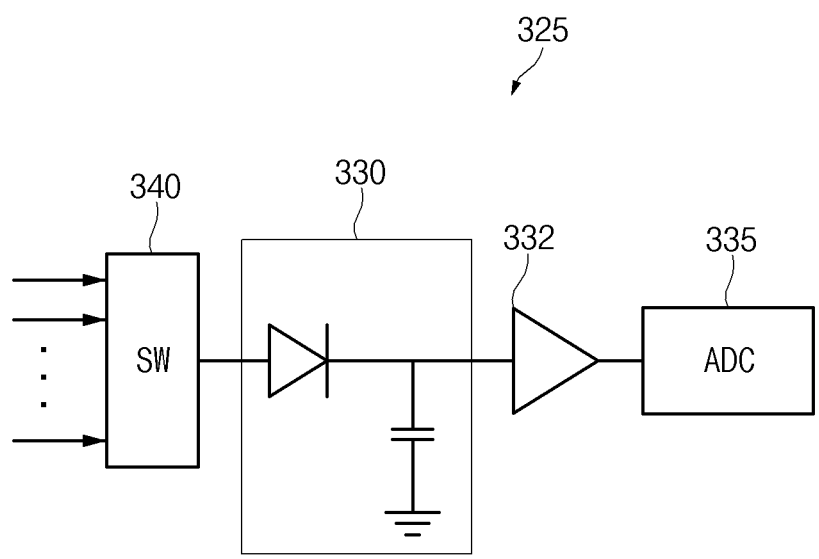
FIG. 3B illustrates a structure of a detection circuit according to an embodiment.

In an embodiment, the detection circuit 325 may further include an analog-to-digital (A/D) converter (e.g., an ADC 335 of FIG. 3B). The A/D converter 335 may be electrically connected with the AM receiver 330. The A/D converter 335 may receive the signal information from the AM receiver 330 and may generate a digital value based on the signal information. The digital value may be a value associated with the at least one antenna element included in the antenna array 310. For example, the AM receiver 330 and the A/D converter 335 may identify an absolute value of a magnitude (e.g., an amplitude) of a signal obtained from the at least one antenna element included in the antenna array 310. The A/D converter 335 may be included in the first communication circuit 320 or may be disposed within the electronic device 101.

In an embodiment, the memory 130 may store reference information. For example, the memory 130 may be understood as a nonvolatile memory. The reference information may include reference values necessary to determine whether the 5G antenna module 300 is normal or abnormal. For example, the reference information may include reference values measured immediately after the electronic device 101 including the 5G antenna module 300 is manufactured or before the electronic device 101 is sold to a user. The reference values may respectively correspond to relevant antenna elements and may be stored in the memory 130.

For example, the reference information may include absolute values of the S-parameter, which are sequentially measured with respect to a plurality of antenna elements included in the antenna array 310 for the purpose of a test. For example, in the case where "n" antenna elements are included in the antenna array 310, absolute values of the S-parameter included in the reference information may be stored in the memory 130 in the form of an n-by-n matrix. However, the disclosure is not limited thereto, and the reference information may include information about a magnitude of a signal identified through the AM receiver 330.

In an embodiment, the electronic device 101 may extract the digital value with regard to at least one antenna element and may compare the extracted digital value with a value included in the reference information. When a difference between the digital value and the value included in the reference information is equal to or greater than a given value, the electronic device 101 may determine the antenna element as abnormal.

In various embodiments, when the difference between the digital value and the value included in the reference information is equal to or greater than the given value, the electronic device 101 may output an abnormal message for the antenna element. For example, the electronic device 101 may output the abnormal message through a display (e.g., the display device 160 of FIG. 1).

FIG. 3B illustrates a structure of the detection circuit 325 according to an embodiment. The detection circuit 325 may include at least one or more of the AM receiver 330, the A/D converter 335, an amplifier 332, and a switch structure 340.

In an embodiment, the AM receiver 330 may include a diode and a capacitor. For example, as one side of the capacitor is connected in parallel with a cathode of the diode, the AM receiver 330 may form a stub circuit. Referring to FIG. 3B, one shape of the AM receiver 330 is illustrated by ways of example. However, the disclosure is not limited to the illustrated shape.

In an embodiment, the A/D converter 335 may be electrically connected with the AM receiver 330. The A/D converter 335 may quantize, for example, signal information received from the AM receiver 330 into "n" bits.

In various embodiments, the detection circuit 325 may further include the amplifier 332 interposed between the AM receiver 330 and the A/D converter 335. The amplifier 332 may amplify an analog signal input from the AM receiver 330.

In an embodiment, the switch structure 340 may be electrically connected with the AM receiver 330. The switch structure 340 may selectively connect, for example, a plurality of receive paths with a plurality of antenna elements included in the antenna array 310 so as to correspond to each other. The AM receiver 330 may selectively receive a signal from the plurality of antenna elements through the switch structure 340.

In various embodiments, when the plurality of antenna elements enter a receive mode, the switch structure 340 may operate to electrically connect the AM receiver 330 with the receive path.

In various embodiments, to obtain reference information, the electronic device 101 may obtain information about a magnitude of a signal and/or an S-parameter value for each of the plurality of antenna elements included in the antenna array 310. For example, when a first antenna element is in a transmit mode and a second antenna element operates in the receive mode, the electronic device 101 may obtain an S21 value. The electronic device 101 may store a value measured for each of the plurality of antenna elements as reference information of the memory 130.

In an embodiment, the electronic device 101 may determine whether the 5G antenna module 300 included in the electronic device 101 is normal or abnormal. In more detail, the electronic device 101 may compare the reference information stored in the memory 130 and a measured value (i.e., a digital value). The electronic device 101 may select an antenna element, which is determined as abnormal, based on a comparison result.

In various embodiments, the electronic device 101 may adjust a gain of an antenna element, which has lower or higher output compared to the reference value included in the reference information, and make the output of the adjusted antenna element similar to the reference value. When a difference is present between the measured value and the reference value after the gain is adjusted, the corresponding antenna element may be determined as abnormal.

In an embodiment, an absolute value of the S-parameter between antenna elements may be used.

Figure 4:
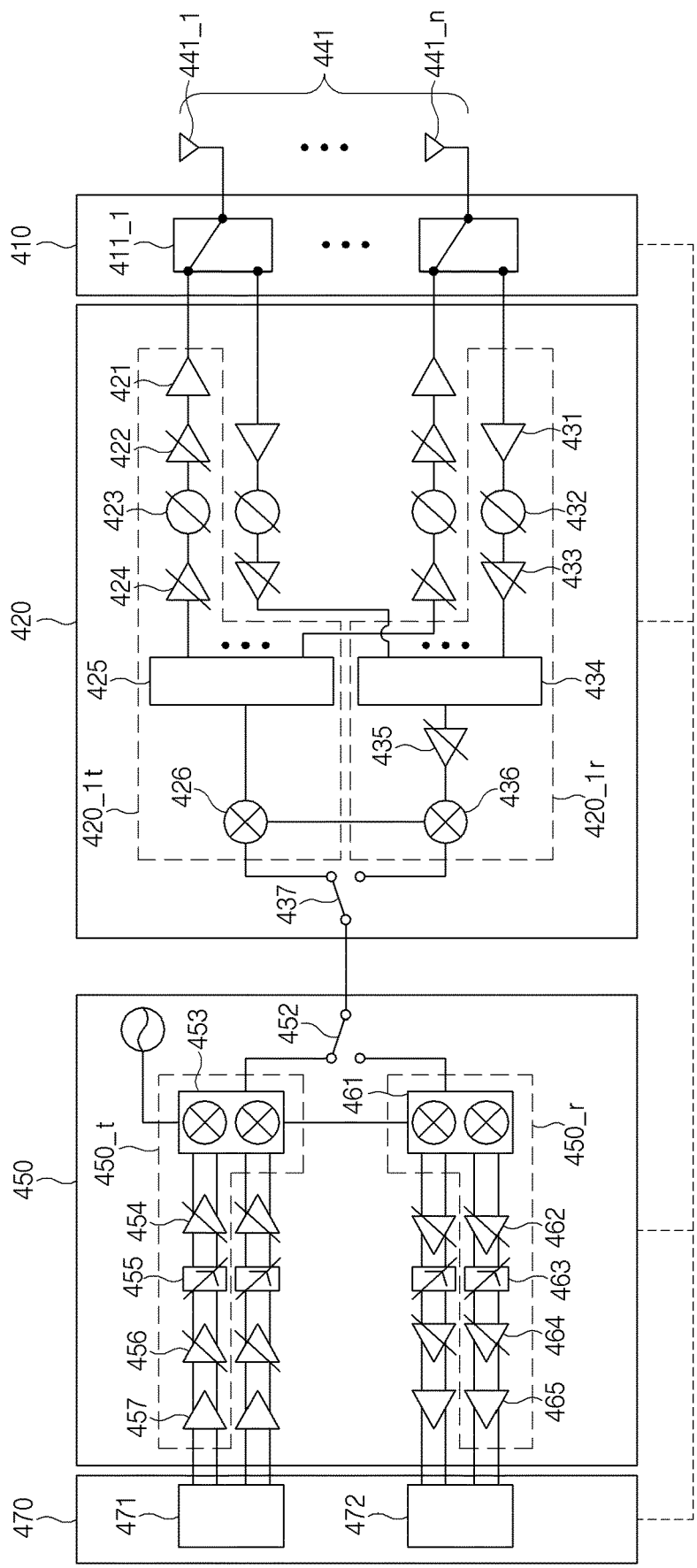
FIG. 4 is a circuit diagram of an antenna module including a communication module according to various embodiments.

FIG. 4 is a circuit diagram of an antenna module 442 including a communication module 420 according to various embodiments.

Referring to FIG. 4, the antenna module 442 may include a switch group 410, the communication module 420 (e.g., the first communication circuit 320 of FIG. 3A), an IFIC 450, and a communication processor 470 (e.g., the processor 120, the first communication processor 212, and/or the second communication processor 214). In various embodiments, any other component(s) may be added to the antenna module 442, or a part of the components of the antenna module 442 may be omitted.

For example, the antenna module 442 may include an antenna array 441 (e.g., the antenna array 310 of FIG. 2), the communication module 420, and the IFIC 450. According to an embodiment, the antenna module 442 may transmit/receive a signal by using the antenna array 441. According to an embodiment, a first antenna element 441_1 included in the antenna array 441 may be connected with the communication module 420 through a switch 411_1 included in the switch group 410. For example, in the case where an electronic device (e.g., the electronic device 101 of FIG. 2) transmits an RF signal (e.g., in the case of a signal transmit mode), the switch 411_1 may connect the first antenna element 441_1 and a power amplifier (PA) (e.g., 421); in the case where the electronic device receives an RF signal (e.g., in the case of a signal receive mode), the switch 411_1 may connect the first antenna element 441_1 and a low noise amplifier (LNA) (e.g., 431).

According to an embodiment, the communication module 420 may include a transmit path 420_1t and a receive path 420_1r with regard to an RF signal.

According to an embodiment, in the case where the electronic device is in the signal transmit mode, the PA 421, a first variable gain amplifier (VGA) 422, a phase shifter (PS) 423, a second VGA 424, a divider 425, and a mixer 426 may be disposed on the transmit path 420_1t of the RF signal.

In an embodiment, the transmit path 420_1t of the RF signal may include a plurality of sub transmission circuits. Each sub transmission circuit may be connected with the antenna array 441. For example, the communication module 420 may include a first sub transmission circuit (421 to 424) connected with the first antenna element 441_1. As in the above structure, the communication module 420 may include a second sub transmission circuit connected with a second antenna element. As in the above manner, the communication module 420 may include an n-th sub transmission circuit connected with an n-th antenna element 441_n.

In an embodiment, the PA 421 may amplify a power of an RF signal to be transmitted. According to an embodiment, the PA 421 may be mounted inside or outside the communication module 420. The first VGA 422 and the second VGA 424 may perform a transmit auto gain control (AGC) operation under control of the communication processor 470. According to an embodiment, the number of variable gain amplifiers may be 2 or more or may be less than 2. The PS 423 may change a phase of an RF signal based on a beamforming angle under control of the communication processor 470.

In an embodiment, the transmit path 420_1t of the RF signal may include a transmission circuit (425, 426). The transmission circuit (425, 426) may be connected with the plurality of sub transmission circuits.

In an embodiment, the divider 425 may split an RF signal provided from the mixer 426 into "n" signals. The number "n" of the divided signals may be, for example, the same as the number of antenna elements (e.g., 441_1 to 441_n) included in the antenna array 441. The mixer 426 may up-convert an IF signal received from the IFIC 450 to an RF signal. In an embodiment, the mixer 426 may receive a signal to be mixed from an internal or external oscillator.

According to an embodiment, in the case where the electronic device is in the signal receive mode, the LNA 431, a PS 432, a first VGA 433, a combiner 434, a second VGA 435, and a mixer 436 may be disposed on the receive path 420_1r of the RF signal.

In an embodiment, the receive path 420_1r of the RF signal may include a plurality of sub reception circuits and a reception circuit (434, 435, 436). Each sub reception circuit may be connected with the antenna array 441. For example, the communication module 420 may include a first sub reception circuit connected with the first antenna element 441_1. As in the above structure, the communication module 420 may include a second sub reception circuit connected with a second antenna element. As in the above manner, the communication module 420 may include an n-th sub reception circuit (431, 432, 433) connected with the n-th antenna element 441_n.

In an embodiment, the LNA 431 may amplify an RF signal received from the at least one of antenna elements 441_1 to 441_n. The first VGA 433 and the second VGA 435 may perform a receive AGC operation under control of the communication processor 470. According to an embodiment, the number of variable gain amplifiers may be 2 or more or may be less than 2. The PS 432 may change a phase of an RF signal based on a beamforming angle under control of the communication processor 470.

In an embodiment, the receive path 420_1r of the RF signal may include a reception circuit (434, 435, 436). The reception circuit (434, 435, 436) may be connected with the plurality of sub reception circuits.

In an embodiment, the combiner 434 may combine RF signals aligned in phase through a phase shift operation. The combined signal may be provided to the mixer 436 through the second VGA 435. The mixer 436 may down-convert the received RF signal to an IF signal. In an embodiment, the mixer 436 may receive a signal to be mixed from an internal or external oscillator.

According to an embodiment, the communication module 420 may further include a switch 437 that electrically connects the mixers 426 and 436 and the IFIC 450. The switch 437 may selectively connect the transmit path 420_1t or the receive path 420_1r of the RF signal with the IFIC 450.

According to an embodiment, at least a part of the receive path 420_1r of the RF signal may be connected with a detection circuit (e.g., the detection circuit 325 of FIG. 3A). For example, at least a part of the reception circuit (434, 435, 435) may be connected with the detection circuit 325.

According to an embodiment, the IFIC 450 may include a transmit path 450_t, a receive path 450_r, and a switch 452 selectively connecting the transmit path 450_t or the receive path 450_r.

According to an embodiment, a mixer 453, a third VGA 454, a low pass filter (LPF) 455, a fourth VGA 456, and a buffer 457 may be disposed on the transmit path 450_t of the IFIC 450. The mixer 453 may convert a balanced in-phase/quadrature-phase (I/Q) signal of a base band to an IF signal. The LPF 455 may function as a channel filter which uses a bandwidth of a baseband signal as a cutoff frequency. In an embodiment, the cutoff frequency may be variable. The third VGA 454 and the fourth VGA 456 may perform a transmit AGC operation under control of the communication processor 470. According to an embodiment, the number of variable gain amplifiers may be 2 or more or may be less than 2. The buffer 457 may function as buffering upon receiving the Balanced I/Q signal from the communication processor 470, and thus, the IFIC 450 may stably process the Balanced I/Q signal.

According to an embodiment, a mixer 461, a third VGA 462, an LPF 463, a fourth VGA 464, and a buffer 465 may be disposed on the receive path 450_r of the IFIC 450. The functions of the third VGA 462, the LPF 463, and the fourth VGA 464 may be the same as or similar to the functions of the third VGA 454, the LPF 455, and the fourth VGA 456 disposed on the transmit path 450_t. The mixer 461 may convert an IF signal transferred from the communication module 420 into a balanced I/Q signal of a baseband. The buffer 465 may function as buffering upon providing the Balanced I/Q signal passing through the fourth VGA 464 to the communication processor 470, and thus, the IFIC 450 may stably process the Balanced I/Q signal.

According to an embodiment, the communication processor 470 may include a Tx I/Q digital analog converter (DAC) 471 and a Rx I/Q analog digital converter (ADC) 472. In an embodiment, the Tx I/Q DAC 471 may convert a digital signal modulated by a modem into a balanced I/Q signal and may provide the balanced I/Q signal to the IFIC 450. In an embodiment, the Rx I/Q ADC 472 may convert a balanced I/Q signal, which is converted by the IFIC 450, into a digital signal and may provide the digital signal to the modem.

According to various embodiments, the communication processor 470 may perform multi input multi output (MIMO).

According to various embodiments, the communication processor 470 may be implemented with a separate chip or may be implemented in one chip together with any other component (e.g., the IFIC 450).

Figure 5:
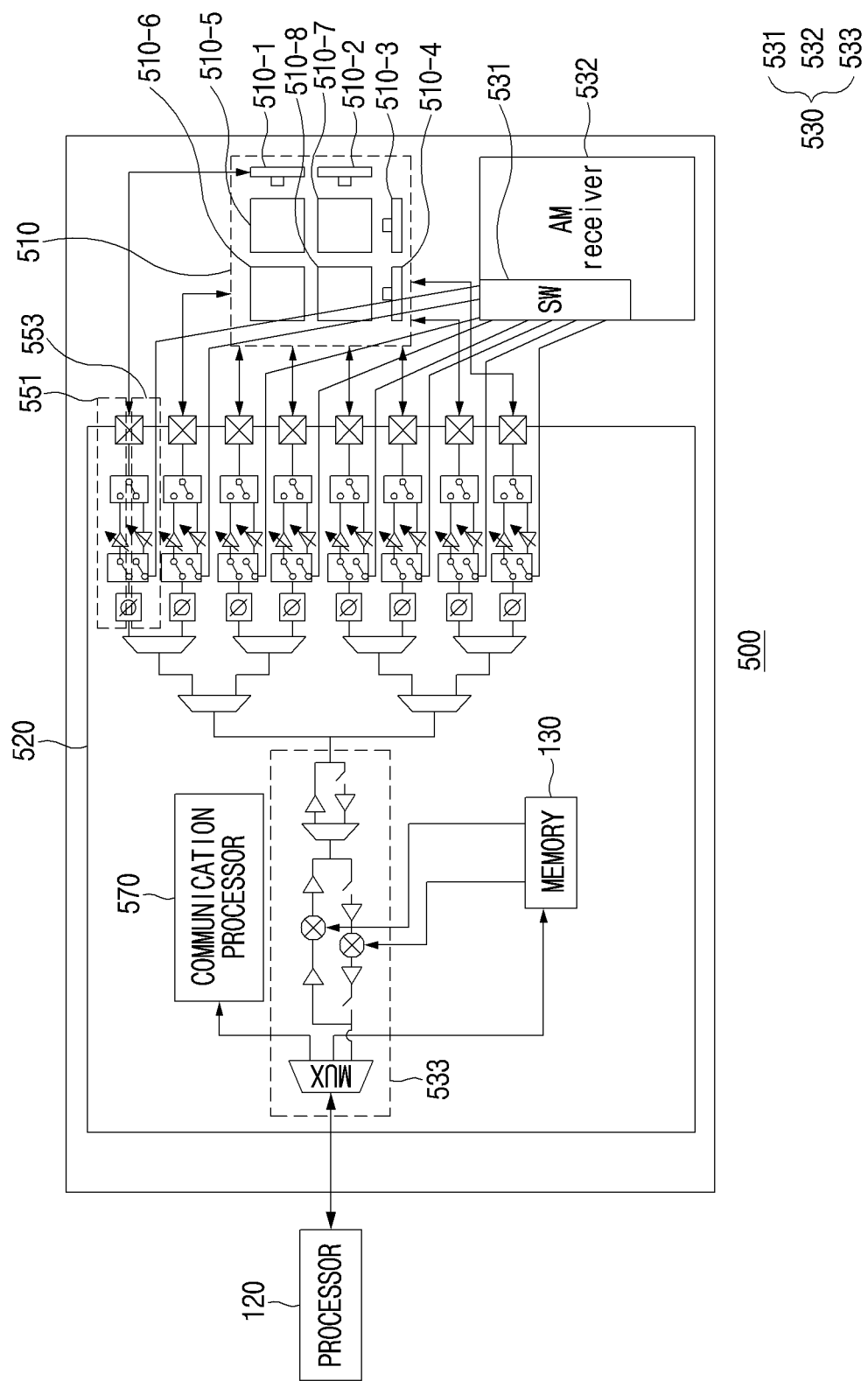
FIG. 5 is a circuit diagram of an antenna module including a communication module to which a detection circuit according to an embodiment is connected.

FIG. 5 is a circuit diagram of an antenna module 500 including a communication module 520 to which a detection circuit 530 according to an embodiment is connected. The communication module 520 of FIG. 5 may correspond to the communication module 420 of FIG. 4.

According to an embodiment, the detection circuit 530 may include a switch structure 531 and an AM receiver 532. Also, the detection circuit 530 may further include an A/D converter. The A/D converter may be together embedded in an integrated circuit where the AM receiver 532 is embedded, so as to be integrally formed with the AM receiver 532.

In an embodiment, the AM receiver 532 may be selectively electrically connected with each of a plurality of receive paths respectively corresponding to a plurality of antenna elements 510-1, 510-2, 510-3, 510-4, 510-5, 510-6, 510-7, and 510-8 included in an antenna array 510 through the switch structure 531.

In an embodiment, the antenna module 442 may include a plurality of receive paths and a plurality of transmit paths respectively corresponding to the plurality of antenna elements 510-1 to 510-8 included in the antenna array 510. For example, the antenna module 500 may include a first receive path 551 and a first transmit path 553 corresponding to the first antenna element 510-1.

In an embodiment, the AM receiver 532 may be selectively connected with the first antenna element 510-1 to the eighth antenna element 510-8 through the switch structure 531.

In an embodiment, the detection circuit 530 may obtain signal information sequentially from the first antenna element 510-1 to the eighth antenna element 510-8 through the AM receiver 532. The detection circuit 530 may process the obtained signal information. For example, the detection circuit 530 may identify a magnitude (e.g., an absolute value of an amplitude) of a signal by using the obtained signal information. For another example, the detection circuit 530 may convert the signal information into a digital value by using the A/D converter.

In an embodiment, the AM receiver 532 may be sequentially connected with the first antenna element 510-1 to the eighth antenna element 510-8 through the switch structure 531. The detection circuit 530 may obtain digital values associated with the first antenna element 510-1 to the eighth antenna element 510-8 thus sequentially connected. The communication module 520 may compare the digital values with reference values that are stored to correspond to the first antenna element 510-1 to the eighth antenna element 510-8. As such, the communication module 520 may sequentially perform abnormality determination on the first antenna element 510-1 to the eighth antenna element 510-8.

In an embodiment, the digital value may be an absolute value of an S-parameter. The communication module 520 may determine whether the corresponding antenna element is normal or abnormal, by comparing the absolute value of the S-parameter of each of the first antenna element 510-1 to the eighth antenna element 510-8, which the detection circuit 530 obtains, with the reference value of the S-parameter included in the reference information stored in advance in the memory 130.

For example, when the first antenna element 510-1 is in the receive mode and the second antenna element 510-2 is in the transmit mode, the communication module 520 may obtain an absolute value of S12. The communication module 520 may determine whether the first antenna element 510-1 is normal or abnormal, by comparing the absolute value of S12 with a reference value associated with S12 included in the reference information.

In various embodiments, the communication module 520 may not obtain an S-parameter value corresponding to a reflection coefficient. The communication module 520 may perform abnormality determination by using only an Sxy component except for an Sxx component.

In various embodiments, the communication module 520 may first perform abnormality determination based on Sxy having a maximum value from among S-parameters. Afterwards, the communication module 520 may normalize the S-parameters with respect to Sxy. The communication module 520 may perform abnormality determination by using a difference between the normalized S-parameters and a reference value. For example, the communication module 520 may specify an S-parameter value as a reference value when the electronic device 101 is first shipped, and may perform abnormality determination through a variation when comparing S-parameters with the reference value.

In an embodiment, the detection circuit 530 may convert a response of each antenna element in the form of a digital signal of a PCM manner through the A/D converter. The detection circuit 530 may send the converted signal to at least one processor 120 or a communication processor 570 (e.g., the first communication processor 212 and/or the second communication processor 214). Accordingly, the abnormality determination for the antenna module 500 may be performed without separate equipment.

In an embodiment, the detection circuit 530 may further include a connection circuit 533 for a connection with the processor 120, the memory 130, and/or the communication processor 570. The connection circuit 533 may load, from the memory 130, reference information that is used for the detection circuit 530 to determine whether the antenna module 500 is abnormal. The connection circuit 533 may send information indicating whether the antenna module 500 is abnormal, which the detection circuit 530 determines, to the processor 120 and/or the communication processor 570. For example, the detection circuit 530 may obtain an RF signal by using a receive path including a reception circuit (e.g., the reception circuit (434, 435, 436) of FIG. 4). The detection circuit 530 may identify the intensity of the obtained RF signal and may compare the intensity of the obtained RF signal with the reference value stored in the memory 130. The detection circuit 530 may send information indicating whether the antenna module 500 is abnormal to the processor 120 and/or the communication processor 570, based at least on the intensity of the obtained RF signal.

Figure 6:
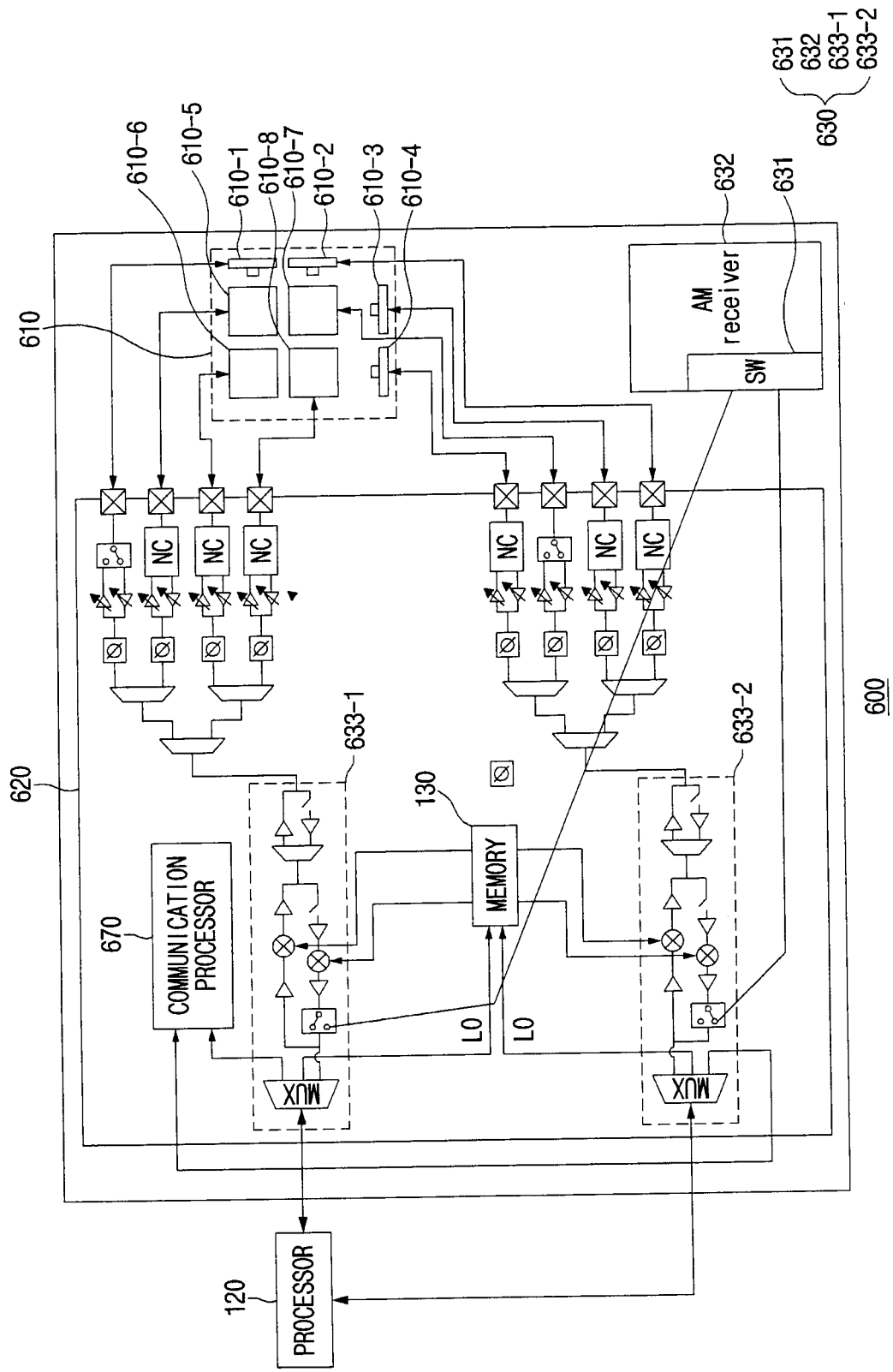
FIG. 6 is a circuit diagram of an antenna module including a communication module to which a detection circuit according to an embodiment is connected.

FIG. 6 is a circuit diagram of an antenna module 600 including a communication module 620 to which a detection circuit 630 according to an embodiment is connected. The communication module 620 of FIG. 6 may correspond to the communication module 420 of FIG. 4.

Referring to FIG. 6, in various embodiments, the antenna module 600 may include a first receive path corresponding to a first group of a plurality of antenna elements 610-1 to 610-8 included in an antenna array 610 and a second receive path corresponding to a second group of the plurality of antenna elements 610-1 to 610-8. For example, the first group may include the first antenna element 610-1, the fifth antenna element 610-5, the sixth antenna element 610-6, and the eighth antenna element 610-8. For another example, the second group may include the second antenna element 610-2, the third antenna element 610-3, the fourth antenna element 610-4, and the seventh antenna element 610-7.

According to an embodiment, the detection circuit 630 may include a switch structure 631 and an AM receiver 632. Also, the detection circuit 5630 may further include an A/D converter. The A/D converter may be together embedded in an integrated circuit where the AM receiver 632 is embedded, so as to be integrally formed with the AM receiver 632.

In an embodiment, the AM receiver 632 may be selectively connected with the first receive path 653-1 and the second receive path 653-2 through the switch structure 631. For example, the first receive path 653-1 and the second receive path 653-2 may receive an RF signal that is obtained by up-converting an IF signal received from a second communication circuit (e.g., the IFIC 450 of FIG. 4).

In an embodiment, when the AM receiver 632 is connected with the first receive path 653-1, the communication module 620 may obtain a digital value associated with one antenna element included in the first group. For example, when the first antenna element 610-1 included in the first group is in the receive mode and a second antenna element included in the second group is in the transmit mode, an absolute value of S12 may be obtained as the digital value.

In various embodiments, when the AM receiver 632 is electrically connected with the first receive path 653-1, the communication module 620 may obtain information about the first antenna element 600-1 to the eighth antenna element 600-8. For example, the communication module 620 may measure the intensity (e.g., an absolute value of an amplitude) of an RF signal that the first antenna element 610-1 to the eighth antenna element 610-8 receive. For another example, the communication module 620 may obtain an S-parameter sequentially with respect to the first antenna element 610-1 to the eighth antenna element 610-8.

In various embodiments, the AM receiver 632 may be included in the first receive path 653-1 and the second receive path 653-2 and may be electrically connected with a receive path (e.g., the receive path 420_1r of FIG. 4) of a signal through a switch structure (e.g., the switch 437 of FIG. 4) connecting the communication module 620 and a second communication circuit (e.g., the IFIC 450 of FIG. 4). In this case, the communication module 620 may determine whether an RF signal input to the communication module 620 through the AM receiver 632 is abnormal. For example, when the RF signal is normal and the plurality of antenna elements 610-1 to 610-8 included in the antenna module 600 are normal, the communication module 620 may determine the antenna module 600 as normal.

Figure 7:
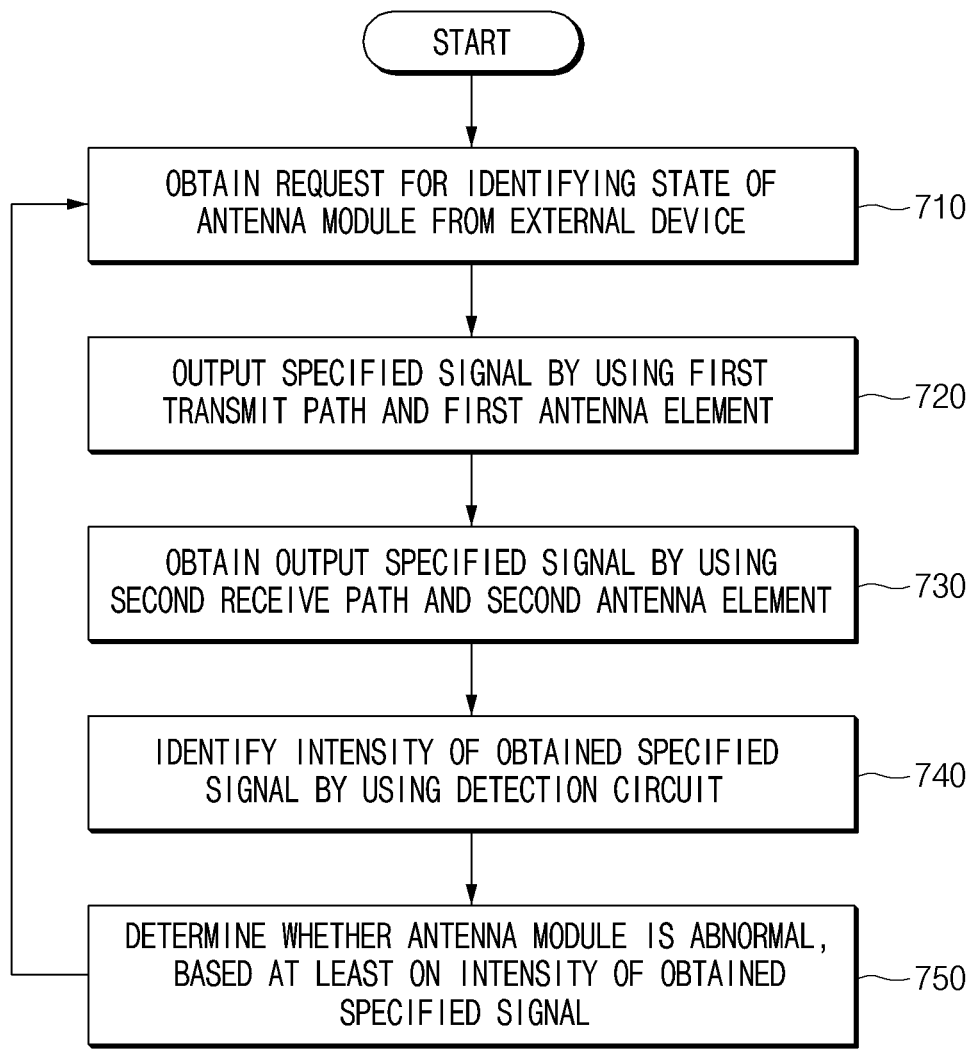
FIG. 7 is a flowchart indicating an operation of an antenna module according to an embodiment.

FIG. 7 is a flowchart illustrating an operation of an antenna module (e.g., the antenna module 442 of FIG. 4) according to an embodiment. An operation of a communication module (e.g., the communication module 420 of FIG. 4) included in the antenna module 442 according to an embodiment will be described with reference to FIG. 7.

In operation 710, the communication module 420 according to an embodiment may obtain a request for identifying a state of the antenna module 442 from an external device.

In operation 720, the communication module 420 according to an embodiment may output a specified signal by using a first transmit path (e.g., the transmit path 420_1t of FIG. 4) and a first antenna element (e.g., the first antenna element 441_1 of FIG. 4). The specified signal may be an RF signal having a specified frequency and a specified intensity.

In operation 730, the communication module 420 according to an embodiment may obtain the output specified signal by using a second receive path (e.g., the receive path 420_1r of FIG. 4) and a second antenna element (e.g., the n-th antenna element 441_n of FIG. 4).

In operation 740, the communication module 420 according to an embodiment may identify the intensity of the obtained specified signal by using a detection circuit (e.g., the detection circuit 325 of FIG. 3A). For example, the detection circuit 325 may identify an absolute value of an amplitude of the obtained specified signal. For another example, the detection circuit 325 may identify an S-parameter value of the obtained specified signal.

In operation 750, the communication module 420 according to an embodiment may determine whether the antenna module 442 is abnormal, based at least on the intensity of the obtained specified signal. For example, when the intensity of the signal, which the detection circuit 325 identifies, differs from the reference value stored in the memory 130 by a specified range or more, the communication module 420 may determine the antenna module 442 as abnormal. For another example, when the S-parameter value of the specified signal, which the detection circuit 325 identifies, differs from the reference value stored in the memory 130 by the specified range or more, the communication module 420 may determine the antenna module 442 as abnormal.

Figure 8:
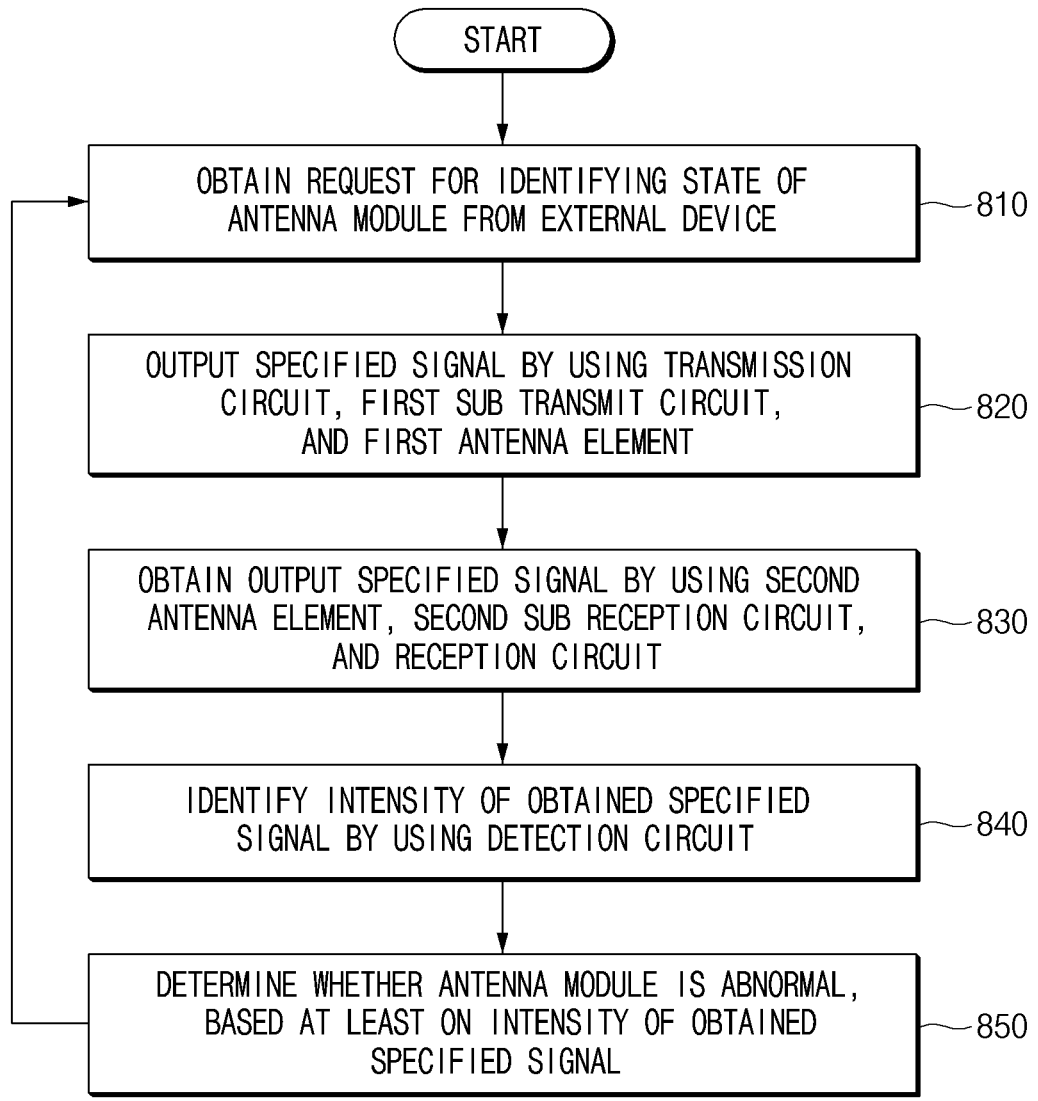
FIG. 8 is another flowchart indicating an operation of an antenna module according to an embodiment.

FIG. 8 is another flowchart illustrating an operation of an antenna module (e.g., the antenna module 442 of FIG. 4) according to an embodiment. An operation of a communication module (e.g., the communication module 420 of FIG. 4) included in the antenna module 442 according to an embodiment will be described with reference to FIG. 8.

In operation 810, the communication module 420 according to an embodiment may obtain a request for identifying a state of the antenna module 442 from an external device.

In operation 820, the communication module 420 according to an embodiment may output a specified signal by using a transmission circuit (e.g., the transmission circuit (425, 426) of FIG. 4), a first sub transmission circuit (e.g., the first sub transmission circuit (421 to 424) of FIG. 4), and a first antenna element (e.g., the first antenna element 441_1 of FIG. 4). The specified signal may be an RF signal having a specified frequency and a specified intensity.

In operation 830, the communication module 420 according to an embodiment may obtain the output specified signal by using a second antenna element (e.g., the n-th antenna element 441_n of FIG. 4), a second sub reception circuit (e.g., the n-th sub reception circuit (431 to 433) of FIG. 4), and a reception circuit (e.g., the receive path (434, 435, 436) of FIG. 4).

In operation 840, the communication module 420 according to an embodiment may identify the intensity of the obtained specified signal by using a detection circuit (e.g., the detection circuit 325 of FIG. 3A).

In operation 850, the communication module 420 according to an embodiment may determine whether the antenna module 442 is abnormal, based at least on the intensity of the obtained specified signal.

Figure 9:
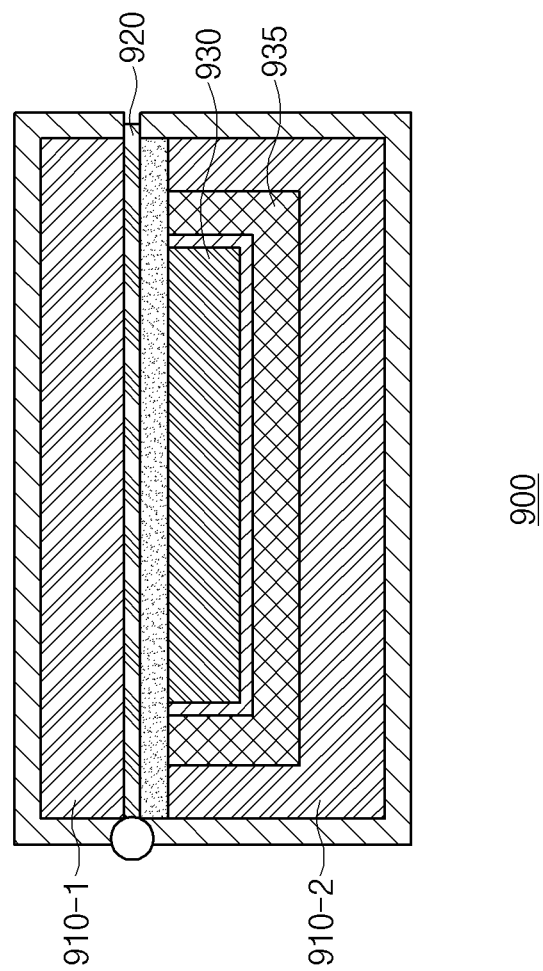
FIG. 9 is a diagram for describing a method for measuring a performance of an antenna module in various embodiments.
Figure 9:
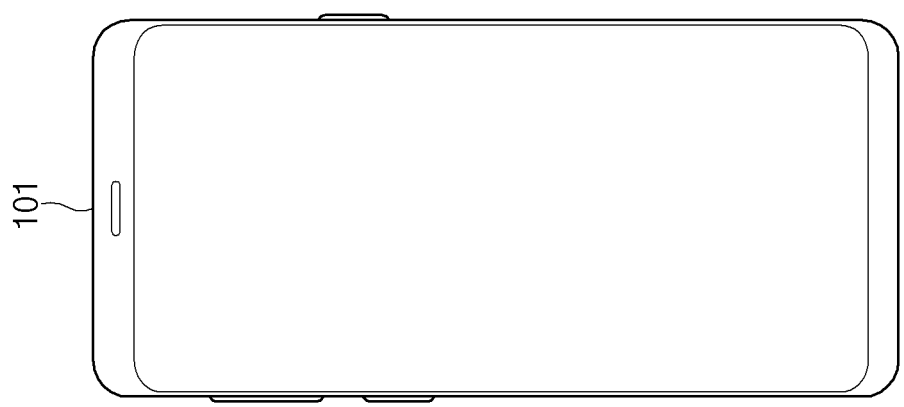

FIG. 9 is a diagram for describing a method for measuring a performance of an antenna module (e.g., the antenna module 442 of FIG. 4, the antenna module 500 of FIG. 5, and/or the antenna module 600 of FIG. 6) in various embodiments.

In various embodiments, the electronic device 101 may perform abnormality determination in a state of being fixed to a jig 900. For a unified test environment, the jig 900 as illustrated in FIG. 9 may be used.

In an embodiment, the jig 900 may include shielding layers 910-1 and 910-2. The shielding layers 910-1 and 910-2 may have an EMI shielding function. The electronic device 101 may be placed in a space 930 of the jig 900 and may be fixed by a fixed member 920. The electronic device 101 may perform abnormality determination in a uniform environment.

In various embodiments, the jig 900 may include a wired/wireless interface that is connected with an external device (e.g., a PC). The jig 900 may obtain calibration information for each kind of the electronic device 101 through the interface.

An antenna module 442 according to various embodiments may include a first antenna element 441_1, a second antenna element 441_n, and a communication module 190 that includes a first transmit path 420_1t and a first receive path connected with the first antenna element 441_1, a second transmit path and a second receive path 420_1r connected with the second antenna element 441_n, and a detection circuit 325 connected with at least a part of the second receive path. The communication module 190 may output a specified signal by using the first transmit path 420_1t and the first antenna element 441_1 based at least on obtaining a request for identifying a state of the antenna module 442 from an external device, may obtain the output specified signal by using the second receive path 420_1r and the second antenna element 441_n, may identify an intensity of the obtained specified signal by using the detection circuit 325, and may determine whether the antenna module 442 is abnormal, based at least on the intensity of the obtained specified signal.

In an embodiment, the detection circuit 325 may include an AM receiver 330 that is electrically connected with the second receive path 420_1r and receives the specified signal.

In an embodiment, the detection circuit 325 may further include an A/D converter 335 that is electrically connected with the AM receiver 330 and converts information included in the specified signal into a digital value.

In an embodiment, the information may include an absolute value of an amplitude of the specified signal or an S-parameter of the specified signal.

In an embodiment, the second receive path 420_1r of the communication module 190 may include a plurality of sub reception circuits 431 to 433 corresponding to the first antenna element 441_1 or the second antenna element 441_n.

In an embodiment, the detection circuit 325 may further include a switch structure 340 capable of being selectively connected with the first antenna element 441_1 or the second antenna element 441_n.

In an embodiment, the communication module 190 may generate a digital value associated with the first antenna element 441_1 based at least on the intensity of the obtained specified signal and may compare the digital value with a reference value associated with the first antenna element 441_1.

In an embodiment, when a difference between the digital value and the reference value is equal to or greater than a given value, the communication module 190 may output an abnormality message associated with the first antenna element 441_1.

An electronic device 101 according to various embodiments may include an antenna array 441 that includes a plurality of antenna elements 441_1 to 441_n, a first communication circuit 320 that transmits/receives a signal in a frequency band of 20 GHz or higher by using the antenna array 441, the first communication circuit 320 including at least one receive path 420_1r of a signal associated with the antenna array 441 and an AM receiver 330 electrically connected with the at least one receive path 420_1r and receives the signal, at least one processor 120 that is operatively connected with the first communication circuit 320, and a non-volatile memory 130 that stores a plurality of reference values associated with the plurality of antenna elements 441_1 to 441_n. The at least one processor 120 may obtain signal information about at least one antenna element 441_1 of the plurality of antenna elements 441_1 to 441_n from the AM receiver 330 and may compare a digital value converted from the signal information and a reference value associated with the at least one antenna element.

In an embodiment, the digital value and the reference value may be an absolute value of an S-parameter associated with the at least one antenna element 441_1.

In an embodiment, the electronic device may further include an A/D converter 335 that is electrically connected with the AM receiver 330 and converts the signal information into the digital value.

In an embodiment, the plurality of reference values may be stored in a format of a matrix including absolute values of an S-parameter associated with the plurality of antenna elements 441_1 to 441_n.

In an embodiment, the plurality of antenna elements 441_1 to 441_n may include a first antenna element 441_1 and a second antenna element 441_n. When the first antenna element 441_1 is in a transmit mode and the second antenna element 441_n is in a receive mode, the AM receiver 330 may be electrically connected with a receive path 420_1r corresponding to the second antenna element 441_n.

In an embodiment, the at least one processor 120 may obtain an absolute value of S21 as the digital value when a first antenna element 441_1 of the plurality of antenna elements is in a transmit mode and a second antenna element 441_n thereof is in a receive mode.

In an embodiment, the AM receiver may further include a switch structure 340 capable of being sequentially connected with the plurality of antenna elements 441_1 to 441_n.

An antenna module 442 according to various embodiments may include a first antenna module 441_1, a second antenna element 441_n, a first sub transmission circuit (421 to 424) and a first sub reception circuit that are connected with the first antenna element 441_1, a second sub transmission circuit and a second sub reception circuit (431 to 433) that are connected with the second antenna element 441_n, a transmission circuit (425, 426) that is connected with the first sub transmission circuit (421 to 424) and the second sub transmission circuit, a reception circuit (434, 435, 436) that is connected with the first sub reception circuit and the second sub reception circuit (431 to 433), and a communication module 190 that includes a detection circuit 325 connected with at least a part of the reception circuit (434, 435, 436). The communication module 190 may output a specified signal by using the transmission circuit (425, 426), the first sub transmission circuit (421 to 424), and the first antenna element 441_1 based at least on obtaining a request for identifying a state of the antenna module 442 from an external device, may obtain the output specified signal by using the second antenna element 441_n, the second sub reception circuit (431 to 433), and the reception circuit (434, 435, 436), may identify an intensity of the obtained specified signal by using the detection circuit 325, and may determine whether the antenna module 442 is abnormal, based at least on the intensity of the obtained specified signal.

In an embodiment, the communication module 190 may obtain a digital value associated with the intensity of the obtained specified signal from the first antenna element 441_1 or the second antenna element 441_n and may compare the digital value with a reference value associated with the first antenna element 441_1 or the second antenna element 441_n.

In an embodiment, the detection circuit 325 may include an AM receiver 330 that is electrically connected with at least a part of the reception circuit (434, 435, 436) and obtains the specified signal, and a switch structure 340 that is selectively connected with the first sub reception circuit and the second sub reception circuit (431 to 433).

In an embodiment, the communication module 190 may obtain an absolute value of an S-parameter associated with the first antenna element 441_1 or the second antenna element 441_n and may compare the absolute value of the S-parameter with a reference value stored in a memory 130.

In an embodiment, the detection circuit 325 may include an A/D converter 335 that converts values associated with the obtained specified signal into a digital value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An antenna module comprising:
a first antenna element;
a second antenna element; and
a communication module including a first transmit path and a first receive path connected with the first antenna element, a second transmit path and a second receive path connected with the second antenna element, and a detection circuit connected with at least a part of the second receive path, wherein the communication module is configured to:
output a specified signal by using the first transmit path and the first antenna element based at least on obtaining a request for identifying a state of the antenna module from an external device;
obtain, by using the second receive path and the second antenna element, the specified signal that is output through the first transmit path and the first antenna element;
identify, by using the detection circuit, an intensity of the specified signal that is obtained through the second transmit path and the second antenna element;
generate a digital value for at least one of the first antenna element and the second antenna element, based at least on the intensity of the obtained specified signal;
compare the digital value with a reference value associated with at least one of the first antenna element and the second antenna element; and
determine whether the antenna module is abnormal, based at least on the comparison result,
wherein the communication module is further configured to:
when determines that the antenna module is abnormal, additionally output the specified signal by using the first transmit path and the first antenna element after adjusting a gain of at least one of the first antenna element and the second antenna element;
re-generate the digital value for at least one of the first antenna element and the second antenna element, based at least on an intensity of the specified signal that is additionally obtained through the second transmit path and the second antenna element; and
re-determine whether the antenna module is abnormal, based on the re-generated digital value and the reference value associated with at least one of the first antenna element and the second antenna element.

2. The antenna module of claim 1, wherein the detection circuit includes:
an amplitude modulation (AM) receiver electrically connected with the second receive path, and configured to receive the specified signal.

3. The antenna module of claim 2, wherein the detection circuit further includes:
an A/D converter electrically connected with the AM receiver, and configured to convert information included in the specified signal into a digital value.

4. The antenna module of claim 3, wherein the information includes an absolute value of an amplitude of the specified signal or an S-parameter of the specified signal.

5. The antenna module of claim 2, wherein the detection circuit further includes:
a switch structure capable of being selectively connected with the first antenna element or the second antenna element.

6. The antenna module of claim 1, wherein the second receive path of the communication module includes:
a plurality of sub reception circuits corresponding to the first antenna element or the second antenna element.

7. The antenna module of claim 1, wherein, when a difference between the digital value and the reference value is equal to or greater than a given value, the communication module is configured to output an abnormality message for at least one of the first antenna element and the second antenna element.

8. An electronic device comprising:
an antenna array including a plurality of antenna elements;
a first communication circuit configured to transmit/receive a signal in a frequency band of 20 GHz or higher by using the antenna array, the first communication circuit including:
at least one receive path of a signal associated with the antenna array; and
an amplitude modulation (AM) receiver electrically connected with the at least one receive path and configured to receive the signal;
at least one processor operatively connected with the first communication circuit; and
a non-volatile memory configured to store a plurality of reference values associated with the plurality of antenna elements,
wherein the at least one processor is configured to:
obtain signal information about at least one antenna element of the plurality of antenna elements from the AM receiver; and
compare a digital value converted from the signal information and a reference value associated with the at least one antenna element from among the plurality of reference values stored in the non-volatile memory;
determine whether the signal received through AM receiver is abnormal based at least on the comparison result;
when the at least one processor determines that the AM receiver is abnormal, adjust a gain of at least one of the at least one antenna element;
re-obtain signal information about the at least one antenna element of the plurality of antenna elements from the AM receiver; and
re-determine whether the signal being received through AM receiver is abnormal, based on the re-obtained signal information and the reference value associated with the at least one antenna element.

9. The electronic device of claim 8, wherein the digital value and the reference value are an absolute value of an S-parameter associated with the at least one antenna element.

10. The electronic device of claim 8, further comprising:
an A/D converter electrically connected with the AM receiver, and configured to convert the signal information into the digital value.

11. The electronic device of claim 8, wherein the plurality of reference values are stored in a format of a matrix including absolute values of an S-parameter associated with the plurality of antenna elements.

12. The electronic device of claim 8, wherein the plurality of antenna elements include a first antenna element and a second antenna element, and
wherein, when the first antenna element is in a transmit mode and the second antenna element is in a receive mode, the AM receiver is electrically connected with a receive path corresponding to the second antenna element.

13. The electronic device of claim 8, wherein the at least one processor may be configured to:
  obtain an absolute value of S21 as the digital value when a first antenna element of the plurality of antenna elements is in a transmit mode and a second antenna element thereof is in a receive mode.

14. The electronic device of claim 8, wherein the AM receiver includes:
  a switch structure capable of being sequentially connected with the plurality of antenna elements.

* * * * *